(No Model.)

W. H. FOYE.
JOURNAL AND BOX.

No. 249,607. Patented Nov. 15, 1881.

Witnesses
Geo. H. Strong.
Frank A. Brooks

Inventor
William H. Foye
By Dewey & Co.
Attys

UNITED STATES PATENT OFFICE.

WILLIAM H. FOYE, OF SAN FRANCISCO, CALIFORNIA.

JOURNAL AND BOX.

SPECIFICATION forming part of Letters Patent No. 249,607, dated November 15, 1881.

Application filed August 20, 1881. (No model.)

*To all whom it may concern:*

Be it known that I, WILLIAM H. FOYE, of San Francisco, in the county of San Francisco and State of California, have invented certain new and useful Improvements in Journals and Boxes for Shafting; and I do hereby declare the following to be a full, clear, and exact description of the same.

My invention relates to journals and boxes for shafting and the frame-work therefor. The object is to secure a flexible frame and line of flexible shafting without binding or in any way interfering with the rotation of the shafting. It is especially adapted for use upon that class of agricultural machinery which includes rotary or gang plows, pulverizers, harrows, and rotary cultivators of any description which require flexibility in order to conform to the irregularities of the ground over which they pass; but the frame-work and the shafting are also adapted for other uses and in other connections. As an illustration of its use I refer to Letters Patent issued to me January 5, 1876, to which it is specially applicable.

Figure 1:
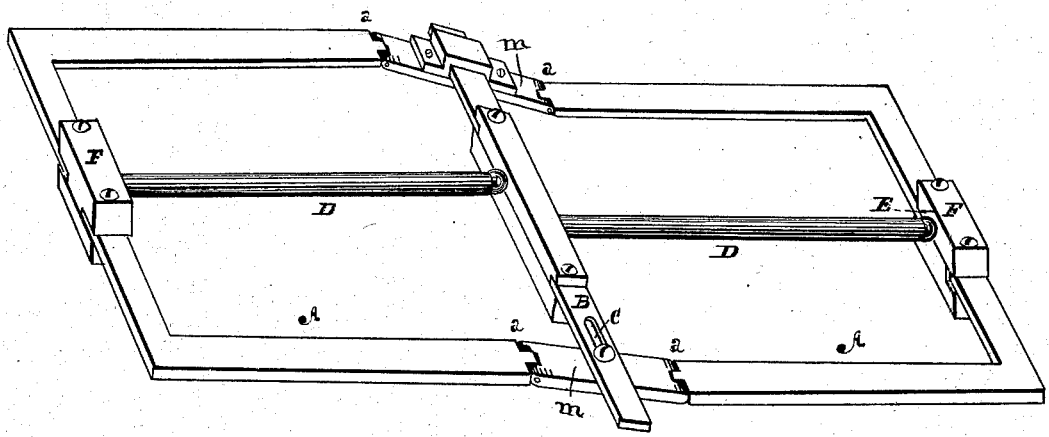
Figure 2:
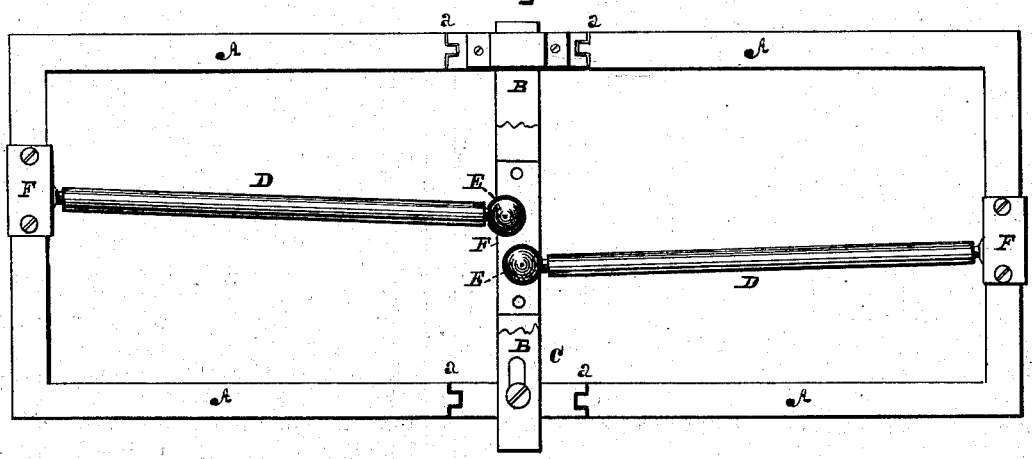

Referring to the accompanying drawings, Figure 1 represents a perspective view of a frame containing my improvements. Fig. 2 is a plan view of same frame, and Fig. 3 is a detached view of one of the shafts with the bearings in section.

In these drawings, A represents a frame composed of side and end bars of any suitable material. The side bars are formed in two main parts connected to each other by intermediate sections, $m$, jointed for horizontal flexion, as shown at $a\ a$. Upon these sections is placed a transverse bar, B. This bar is preferably placed at the central part of the frame. It is held to the intermediate pieces, $m$, by means of a strap or bolt, both of which are shown in the drawings, or other convenient means for the purpose may be used. A bolt, when a bolt is used, passes through a slot in the bar, as shown at $c$, whereby the longitudinal movement of the bar B is limited. By means of this endwise adjustability of the bar B the shafts D D may be made to assume any desired angle with relation to each other in respect to the vertical planes thereof.

The shafts D D are supported at their outer ends in boxes, hereinafter to be described, in the cross-pieces of the main frame, and at their inner ends in similar boxes upon the movable cross-bar B. It will be observed, therefore, that with suitable boxes the frame may be bent out of horizontal plane, as shown in Fig. 1, so as to make the shafts D D assume positions out of such plane, and also by the shifting of the bar B the same shafts may be made to take various positions in different vertical planes, and in this way combined flexibility of the shafting is obtained.

Figure 3:

The special construction of the bearings is shown more clearly in Fig. 3. They consist of spherical balls E, perforated as shown in the last-named figure, to receive the journals, which may have limited endwise movement in said bearings. I prefer that the perforations which admit the journals should not extend quite through the bearings. These bearings are located in boxes F F, placed in the cross-pieces at the end and in the cross-bar B. These boxes are made in two pieces with nearly spherical cavities fitted exactly to receive the spherical bearings. The cavities are shown more clearly in Fig. 2, and are located nearer to the edge, so as not quite to inclose the bearings, but to leave a space for the movement of the shaft without bringing it into contact with the sides of the box when the frame is bent or the bar B shifted from side to side.

It will be apparent in the movements heretofore explained that the journals of the shafts must move endwise in their boxes, sometimes being slightly drawn out and sometimes pushed inward, and the size of the bearings and the depth of the perforations must be adapted to the amount of flexion to which the frame-work may be subjected.

It will also be apparent that rotary plows or like instruments or pulleys may be placed upon the shafts D to communicate power, or to perform the work required in whatever kind of mechanism the frame may be used.

I am aware of the common ball-and-socket joint, in which a ball fixed upon the end of the shaft works in a box. My journal and bearing differs from this in having the ball loose and perforated and the journal of the shaft playing thereon.

What I claim is—

1. The combination of the spherical perforated bearing E, the journal of the shaft D, and the box F, having cavity adapted to the bearing, the parts being adapted for operation in a structure or frame-work, substantially as described.

2. The combination of the flexible frame A, the movable cross-piece B, the shafts D D, and the spherical bearings and boxes, substantially as described.

3. The combination of the frames a a, intermediate pieces, m m, jointed thereto, transverse movable bar B, shafts D D, and spherical bearings and boxes, substantially as described.

In witness whereof I have hereunto set my hand.

WILLIAM H. FOYE.

Witnesses:
FRANK A. BROOKS,
S. H. NOURSE.